United States Patent [19]

Jung

[11] Patent Number: 5,868,497
[45] Date of Patent: Feb. 9, 1999

[54] THERMOCOUPLE FOR USE IN AN APPARATUS FOR MANUFACTURING A SEMICONDUCTOR DEVICE

[75] Inventor: Dong-ok Jung, Suwon, Rep. of Korea

[73] Assignee: Samsung Electronics Co., Ltd., Suwon, Rep. of Korea

[21] Appl. No.: 774,607

[22] Filed: Dec. 30, 1996

[30] Foreign Application Priority Data

Feb. 22, 1996 [KR] Rep. of Korea ............... 1996 4202

[51] Int. Cl.$^6$ .............................. G01K 7/02; H01L 35/02
[52] U.S. Cl. ............................................. 374/179; 136/230
[58] Field of Search ........................... 374/179; 136/230, 136/200, 227, 224

[56] References Cited

U.S. PATENT DOCUMENTS

| 2,625,573 | 1/1953 | Connell | 136/230 |
| 2,999,121 | 9/1961 | Mead | 374/140 |
| 3,232,794 | 2/1966 | Korton | 374/179 |
| 3,283,580 | 11/1966 | Nanigian et al. | 136/230 |
| 3,357,250 | 12/1967 | Lowdermilk | 374/140 |
| 3,501,957 | 3/1970 | Jones, Jr. | 374/140 |
| 3,643,509 | 2/1972 | Surinx | 374/140 |
| 4,018,624 | 4/1977 | Rizzolo | 374/179 |
| 4,217,463 | 8/1980 | Swearingen | 374/179 |
| 4,752,770 | 6/1988 | St. Pierre | 374/179 |
| 5,520,461 | 5/1996 | Curry et al. | 374/179 |

FOREIGN PATENT DOCUMENTS

| 1423845 | 11/1965 | France | 374/179 |
| 1173203 | 8/1985 | U.S.S.R. | 374/179 |

OTHER PUBLICATIONS

Akimovich, I.N. et al., "Tungsten–rhenium Thermocouple for Oxidizing Media," Meas. Tech (USA), vol. 14, No. 7 (Jul. 1971).

*Primary Examiner*—Christopher M. Fulton
*Attorney, Agent, or Firm*—Jones & Volentine, L.L.P.

[57] ABSTRACT

A thermocouple for use in an apparatus for manufacturing a semiconductor device having two metal wires, each composed of a different material, being connected at one end. A first insulator extends a first length from the connected end of the metal wires and electrically insulates a portion of one of the metal wires. A second insulator, having a brittleness factor less than that of the first insulator, extends a second length from the first insulator along the same metal wire. The lifetime of the thermocouple can be lengthened and productivity of the semiconductor device can be enhanced.

8 Claims, 1 Drawing Sheet

5,868,497

THERMOCOUPLE FOR USE IN AN APPARATUS FOR MANUFACTURING A SEMICONDUCTOR DEVICE

BACKGROUND OF THE INVENTION

1. Field of the Invention

The present invention relates to a thermocouple of an apparatus for manufacturing a semiconductor device, and more particularly, to a thermocouple in which one of the metal wires forming the thermocouple is coated with two different insulator materials, each of a predetermined length.

2. Description of the Related Art

Since the temperature during the process of manufacturing a semiconductor device is very high, a thermocouple is used for sensing the temperature instead of a general thermometer. The thermocouple has two metal wires, each composed of a different material. Only one end of each of the two metal wires is connected, thereby creating a potential difference between the two metal wires at the other (unconnected) end. This potential difference is then measured to thereby indirectly measure the temperature of the connected portion of the metal wires.

The principle utilized in the above thermocouple is the so-called Seebeck effect. The Seebeck effect is where a potential difference is generated due to the thermal driving force and is briefly described as follows.

In the case of a metal having a temperature gradient, electrons in the relatively hotter portion of the metal have an average kinetic energy higher than those in the relatively cooler portions thereof. This relationship can be represented by 3KT/2 where K is the Boltzmann's constant and T is absolute temperature. Accordingly, electrons have a tendency to move from the hotter region to the cooler region in order to reduce the average kinetic energy. That is, the electrons of the hotter region are diffused into the cooler region by a thermal driving force. However, when the electrons are thus diffused, a potential difference called the Seebeck voltage is created between the two regions, such that the cooler region electrons have a tendency to return to the hotter region. A state of equilibrium is realized when the Seebeck voltage is exactly balanced with the thermal driving force with respect to the electron flow. Therefore, the thermal driving force can be measured by the Seebeck voltage.

The Seebeck voltage differs according to the type of metal being employed in the thermocouple. When one end of each of two different metal wires is connected to each other and the connected portion is positioned where the temperature is to be measured, a potential difference is created between the unconnected ends as described above. Accordingly, the temperature of the portion to be measured can be indirectly measured by measuring the potential difference of the two metal wires. The above thermocouple adopts this principle.

FIG. 1 is a schematic view of a pyrogenic system generally used in a vapor oxidation process, showing an apparatus for manufacturing a semiconductor device using a thermocouple.

In detail, reference numeral 10 denotes a pyrogenic tube in which a pyrogenic reaction occurs, reference numeral 12 denotes a body of the pyrogenic system surrounding the pyrogenic tube 10, reference numerals 14 and 16 denote hydrogen and oxygen intakes for injecting hydrogen and oxygen, respectively, and reference numeral 18 denotes a heat collector mounted on the end (positioned inside the pyrogenic tube 10) of the hydrogen intake 14. Here, SiC having a high thermal conduction is, in general, used for the heat collector 18. Reference numeral 19 denotes a thermocouple having one end positioned near the heat collector 18 to measure the temperature of the heat collector and the other end connected to a temperature controller (not shown) positioned outside of the pyrogenic system. Reference numeral 30 denotes a lamp for supplying the heat collector 18 with thermal energy by irradiation. Here, since the lamp 30 should supply thermal energy in the form of light, an infrared lamp is generally used. Reference numeral 32 denotes a reflector for directing the heat generated from the lamp 30 onto the heat collector 18, and reference numeral 34 denotes a body of a heat generator for supporting the lamp 30 and the reflector 32.

The operation of the pyrogenic system will now be briefly described. Light energy generated from the lamp 30 collects on the heat collector 18, assisted by the reflector 32, and the temperature of the heat collector rises accordingly. Once the temperature of the heat collector 18 reaches a certain point, the hydrogen and oxygen injected through the intakes 14 and 16 are reacted to generate a vapor. The vapor flows into the pyrogenic tube 10, via a diffusion path (not shown) in which a wafer to be oxidized is located, to carry out a vapor oxidation process for forming an oxide film on the wafer.

For uniform vapor oxidation, the temperature of the heat collector 18 should rise to a predetermined temperature within a predetermined time. Then, to maintain this temperature, the temperature of the heat collector 18 is controlled by a temperature controller (not shown) which compares the heat collector temperature sensed by the thermocouple 19 to a predetermined value in order to control the power supplied to the lamp 30 and in turn the amount of light irradiated by the lamp 30. If, however, the temperature of the heat collector 18 is not rapidly transmitted to the thermocouple 19, the temperature of the pyrogenic tube 10 cannot reach the desired temperature in the proper time. Thus, the thermocouple material should exhibit high thermal conduction.

FIG. 2 is a schematic view of a conventional thermocouple. In detail, reference numerals 100 and 110 denote first and second metal wires having a connection point A where one end of each is connected. Reference numeral 120 denotes a base for supporting the first and second metal wires 100 and 110. The left part of the support 120 is positioned in the pyrogenic tube 10 of FIG. 1, and the right part is positioned at the outside of the pyrogenic tube 10 of FIG. 1. The right part has a portion that is connected to a temperature controller (not shown). Reference numeral 113 denotes an insulator for coating the second metal wire 110 between the connection point A and the support 120. Reference numeral 130 denotes a polymer (pliant) insulator for coating portions of the first and second metal wires 100 and 110 which are located between the support 120 and the temperature controller.

According to the conventional thermocouple as described above, quartz is used for the insulator 113 in order to obtain the desired high thermal conduction. Quartz, however, is highly brittle and is therefore subject to fracturing even with a slight physical shock, which may short-circuit the first and second metal wires 100 and 110. Accordingly, the life expectancy of the thermocouple is short, resulting in the frequent stoppage of the vapor oxidation process and subsequent productivity decreases.

SUMMARY OF THE INVENTION

Accordingly, it is an object of the present invention to provide a thermocouple of an apparatus for manufacturing a semiconductor device in which insulator breakage is reduced and lifetime is lengthened.

To achieve this and other objects, there is provided a thermocouple of an apparatus for manufacturing a semiconductor device, comprising: two metal wires, each composed of a different material, being connected at one end; a first insulator, extending a first length from the connected end of the metal wires, for electrically insulating a portion of one of the metal wires; and a second insulator, having a brittleness factor less than that of the first insulator and extending a second length from the first insulator, for electrically insulating a second portion of the same metal wire.

It is preferable that the first insulator be formed of quartz and the second insulator be formed of ceramic. The length of the first insulator is less than that of the second insulator, and preferably, the length of the first insulator is 17% to 34% of the combined length of the first and second insulators.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 2:
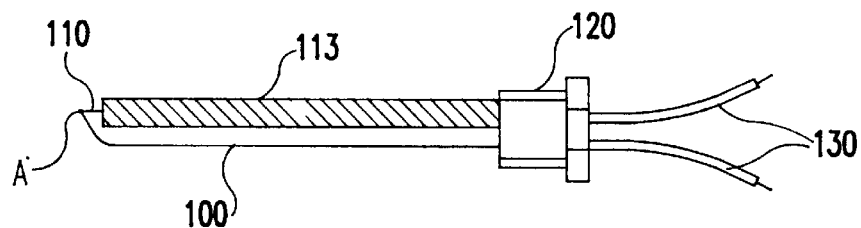
FIG. 2 is a schematic view of a conventional thermocouple.
Figure 3:
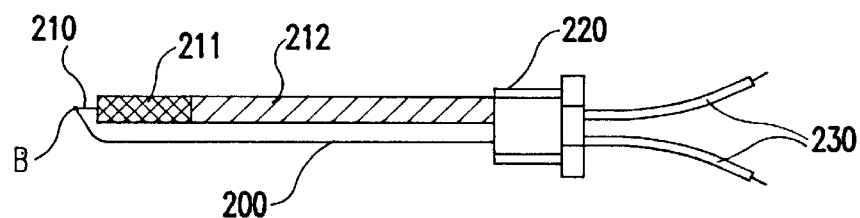
FIG. 3 is a schematic view of a thermocouple according to the present invention.

In FIG. 3, reference designations 200, 210, 220, 230 and B correspond to reference designations 100, 110, 120, 130 and A of FIG. 2. To solve the brittleness problem of the conventional art described above, in the present invention one metal wire is partially coated with a material of high thermal conduction that exhibits less brittleness than that of the quartz used throughout the conventional thermocouple. In the present invention, two insulators 211 and 212, one being formed of a material having a high thermal conduction and the other being formed of a material exhibiting low brittleness, are substituted for the insulator 113 of FIG. 2.

Figure 1:
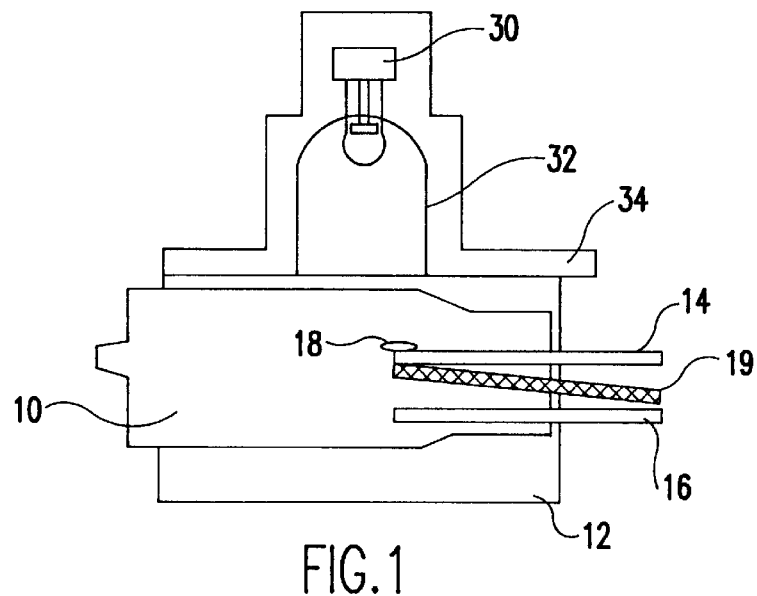
FIG. 1 is a schematic view of a pyrogenic system generally used for a vapor oxidation process.

One end of each of the first metal wire 200 and the second metal wire 210 are connected to each other at connection point B. In this embodiment, the first and second metal wires 200 and 210 should be formed of different materials, to utilize the above-described Seebeck effect. In this embodiment, the support 220 can be formed as bolt for connection to the pyrogenic tube 10 of FIG. 1.

To electrically insulate the first and second metal wires 200 and 210, the second metal wire 210 is coated with the first and second insulators 211 and 212 between the connection point B and the support 220. In detail, the first insulator 211 extends a first length along the second metal wire 210 from the connection point B to thereby coat the second metal wire 210. The first insulator directly receives the heat from the heat collector 18 of FIG. 1. Preferably, an insulating material having good thermal conduction properties, e.g., quartz, is used for the first insulator 211.

A second insulator extends a second length along the metal wire 210 from the first insulator to thereby coat the remaining portion of the second wire 210. The second insulator 212 should be formed of an insulator having low brittleness (i.e., lower than that of the first insulator 211). Preferably, a ceramic material having a high refractoriness is used. Examples include, alumina ($Al_2O_3$), mullite ($3Al_2O_3$-$2SiO_2$), steatite ($MgO$—$SiO_2$), forsterite ($2MgO$—$SiO_2$), spinel ($MgO$—$Al_2O_3$), and cordierite ($MgO$—$Al_2O_3$-$2.5SiO_2$).

In the present invention, therefore, part of the second metal wire is coated with quartz having a high thermal conduction (i.e., higher than that of the ceramic employed). Thus, the quartz can rapidly sense the temperature of the heat collector at the connection point B, to thereby reduce the process time. Also, the second insulator 212 can have a lower thermal conduction than that of the first insulator 211, since the second metal wire 210 surrounded with the second insulator 212 does not directly receive the heat from the heat collector 18.

However, as in the conventional thermocouple, a short may still occur between the first and second metal wires since quartz has a high brittleness factor. This problem is more severe in the case of a relatively long first insulator portion. Accordingly, in view of the thermal conduction properties and in order to prevent shorting, each of the two insulators have a predetermined length. Preferably, the length of the second insulator 212 should be longer than that of the first insulator 211. More preferably, the first insulator 211 may be 17% to 34% of the total length of the first and second insulators, and the second insulator 212 may be 66% to 83% of the total length. Most preferably, the first insulator is 26% of the total length and the second insulator is 74% of the total length.

The third insulator 230 is formed of an elastic material, e.g., polymer, in order to insulate the first and second metal wires 200 and 210 for connection to the temperature controller via the support 220.

According to the above embodiment of the present invention, the second metal wire 210 is coated with a first insulator 211 having a high thermal conduction near the connection point B. The second metal wire 210 is also coated with a second insulator 212 having a relatively low brittleness factor, away from the connection point B. Accordingly, the overall brittleness is reduced such that even though part of the insulator, e.g., the first insulator 211, may suffer fracturing, the remainder thereof, e.g., the second insulator 212, will not. Thus, the potential for shorting the first and second metal wires 200 and 210 between connection point B and the support 220 is greatly reduced. Accordingly, the thermocouple functions sufficiently and has a longer lifetime, thereby enhancing the productivity of a semiconductor device.

It should be understood that the invention is not limited to the illustrated embodiment and that many changes and modifications can be made within the scope of the invention by one of ordinary skill in the art.

What is claimed is:

1. A thermocouple for use in an apparatus for manufacturing a semiconductor device, the thermocouple comprising:
   two metal wires, each composed of a different material, being connected at one end;
   a first insulator, extending a first length from the connected end of said metal wires, for electrically insulating a first portion of one of said metal wires; and
   a second insulator, having a brittleness factor less than that of said first insulator and extending a second length from said first insulator, for electrically insulating a second portion of said one of said metal wires.

2. A thermocouple for use in an apparatus for manufacturing a semiconductor device according to claim 1, wherein said first insulator is formed of quartz.

3. A thermocouple for use in an apparatus for manufacturing a semiconductor device according to claim 1, wherein said second insulator is formed of ceramic.

4. A thermocouple for use in an apparatus for manufacturing a semiconductor device according to claim 3, wherein said ceramic is selected from the group consisting of alumina ($Al_2O_3$), mullite ($3Al_2O_3$-$2SiO_2$), steatite (MgO—$SiO_2$), forsterite ($2MgO$—$SiO_2$), spinel (MgO—$Al_2O_3$), and cordierite (MgO—$Al_2O_3$-$2.5SiO_2$).

5. A thermocouple for use in an apparatus for manufacturing a semiconductor device according to claim 1, wherein said first insulator has a higher thermal conductivity than said second insulator.

6. A thermocouple for use in an apparatus for manufacturing a semiconductor device according to claim 1, wherein said first length is less than said second length.

7. A thermocouple for use in an apparatus for manufacturing a semiconductor device according to claim 6, wherein said first length is 17% to 34% of a combined length of said first and second insulators.

8. A thermocouple for use in an apparatus for manufacturing a semiconductor device according to claim 6, wherein said first length is 26% of a combined length of said first and second insulators.

* * * * *